United States Patent [19]

Wörner et al.

[11] Patent Number: 4,944,712
[45] Date of Patent: * Jul. 31, 1990

[54] SPLIT FLYWHEEL WITH VIBRATION COMPENSATION BETWEEN VEHICLE ENGINE AND DRIVE TRAIN

[75] Inventors: Günter Wörner, Kernern; Ernst Tscheplak, Weinstadt, both of Fed. Rep. of Germany

[73] Assignee: Daimler-Benz AG, Fed. Rep. of Germany

[ * ] Notice: The portion of the term of this patent subsequent to Feb. 27, 2007 has been disclaimed.

[21] Appl. No.: 289,033

[22] Filed: Dec. 23, 1988

[30] Foreign Application Priority Data

Dec. 23, 1987 [DE] Fed. Rep. of Germany ....... 3743801

[51] Int. Cl.$^5$ .......................... F16D 3/14; F16F 15/12
[52] U.S. Cl. ....................... 464/67; 74/574; 464/68
[58] Field of Search ....................... 74/574; 192/106.2; 464/64, 66, 67, 68

[56] References Cited

U.S. PATENT DOCUMENTS 4,714,449 12/1987 Woerner et al. ...................... 464/68
4,760,754 8/1988 Friedmann ................... 192/106.2 X

FOREIGN PATENT DOCUMENTS 0239457 9/1987 European Pat. Off. ......... 192/106.2
3410953 5/1985 Fed. Rep. of Germany ........ 464/66
3629225 3/1987 Fed. Rep. of Germany ........ 464/68
3721710 1/1988 Fed. Rep. of Germany .
2171172 8/1986 United Kingdom ............. 192/106.2
2180322 3/1987 United Kingdom ................... 464/68
2193790 2/1988 United Kingdom ............. 192/106.2

OTHER PUBLICATIONS

"The Two-Mass Flywheel-A Torsional Vibration Damper for the Power Train of Passenger Cars-State of the Art and Further Technical Development", Sebulke, SAE Technical Paper Series 870394, 2/1987.

Primary Examiner—Daniel P. Stodola
Attorney, Agent, or Firm—Evenson, Wands, Edwards, et al.

[57] ABSTRACT

A split flywheel construction having a spring arrangement coupling two flywheel elements together which works by friction dependent on centrifugal force, so that the coupling of the flywheel elements is stiffened at higher speeds. At operating speeds, an undesirable flexibility of a drive train is thereby prevented while at low speeds and with low friction a low resonant frequency is obtained below the vibration frequencies occurring in the drive train at these speeds.

17 Claims, 5 Drawing Sheets

SPLIT FLYWHEEL WITH VIBRATION COMPENSATION BETWEEN VEHICLE ENGINE AND DRIVE TRAIN

The invention relates to a split flywheel with two equiaxial flywheel elements to which the flywheel masses are essentially apportioned and with a spring arrangement inserted between the flywheel elements with a non-positive coupling arranged between an abutment part of the spring arrangement and one flywheel element.

Split flywheels of this general type are basically known. The resonant frequency of the flywheels should be as low as possible to guarantee that vibrations occurring in the drive train during motoring have a frequency above the resonant frequency of the flywheel, i.e. in the so-called supercritical range. Thus during motoring, the drive train is separated from the engine in terms of vibration.

Since it is necessary to pass through the resonant range of the split flywheel during the starting of the engine, at least during several successive attempts at starting difficulties, there is the danger that the resonant frequency of the flywheel will be excited for relatively long periods of time and that vibrations with considerable amplitudes will occur. To compensate for defects on the flywheel or on the drive train, it is known to connect the spring arrangement coupling the flywheel elements in series with a non-positive coupling which, in the event of excessive vibration amplitudes or the very high torques occurring thereby, allows an additional relative rotation between the flywheel elements and restricts the maximum torque transfer between the flywheel elements.

Modern engines can work at a very low idling speed. If the aim is to ensure that even the idling speed, or the vibrations possibly occurring at the same time, come within the supercritical range of the split flywheel, the spring arrangement must have a comparatively low spring constant, that is to say be very soft. This is because the resonant frequency has values which are lower, the lesser the rigidity of the spring arrangement. However, during motoring, the disadvantage of a spring arrangement of low rigidity occurs during load direction alternations which would admit of comparatively large relative movements between the flywheel elements. This is true because the spring arrangement has to be braced in the particular load direction for torques to be transmitted during motoring. With soft spring arrangements, a larger relative rotation between the flywheel elements is necessary. Accordingly, when there are load alternations, the flywheel elements have to rotate extremely far relative to one another, until a sufficiently high torque can again be transmitted in the respective opposite load direction.

Apart from the fact that a high elasticity of the drive train usually has a disturbing effect, there is the danger that when load alternations succeed one another at short intervals, the resonant frequency of the split flywheel could be excited.

Therefore the object of the invention is to provide a split flywheel which works in the supercritical range even at very low engine speeds, especially at speeds below the idling speed and nevertheless guarantees a sufficient rigidity of the drive train during load direction alternations.

In a split flywheel of the type mentioned in the introduction, this object is achieved in that at least one spring group of the spring arrangement consists of long-stroke non-prestressed, or negligibly prestressed, helical springs which have a helical axis in the form of an arc of a circle with a center of curvature at the flywheel axis and which works by friction dependent on centrifugal force. These springs are urged by centrifugal force against bearing faces arranged on the abutment part, or on a flywheel element which support the springs radially outwards relative to the flywheel axis. The spring constants of the spring arrangement are calculated in such a way that the vibrations occurring at a low engine speed are in the supercritical range.

The invention is based on the general notion that at low engine speeds near the idling speed, only extremely low torques can or must be transmitted. Accordingly, the high compliance of the long-stroke helical springs cannot lead to larger relative rotations between the flywheel elements at low speeds. As soon as the speed increased, although the engine can transmit relatively high torques to the drive train, nevertheless excessive relative rotations between the flywheel elements are prevented. This is true even during load alternations, because, as a result of the centrifugal forces effective at higher speeds, the long-stroke springs experience appreciable friction on the bearing faces and correspondingly become relatively inflexible. The result of this is that relative rotations occurring between the flywheel elements, during load alternations can take place only counter to a relatively high resistance which, even in the event of load alternations succeeding one another at very short time intervals, prevents undesirable vibrations of very low frequency from being excited in the drive train.

In engines with especially quiet running, such as for example, six-cylinder in-line engines, it is usually sufficient if the entire spring arrangement consists solely of the long-stroke springs. Their compliance at low speeds guarantees the separation between the drive train and the engine in terms of vibration, which is desirable in slow-running engines. At either speeds, the stiffening of the springs associated therewith does not lead to any loss of comfort, because under these operating conditions there is freedom from vibration.

In engines with a small number of cylinders, for example four-cylinder in-line engines, it is usually advantageous if the spring arrangement possess, in addition to the long-stroke springs with a compliance dependent on centrifugal force, a further spring group consisting of short-stroke relatively rigid springs, the compliance of which is influenced negligibly, if at all, by centrifugal force. At higher speeds when the long-stroke springs have stiffened substantially as a result of the influences of the centrifugal force, the short-stroke springs alone determine the vibration behavior of the split flywheel. Although this means the resonant frequency of the split flywheel increases as a result of the higher spring constant of the short-stroke springs, nevertheless the vibrations possibly occurring in the drive train at higher speeds are in any case of comparatively high frequency, so that the split flywheel nevertheless still works in the supercritical range. As soon as the speed decreases, the resonant frequency of the split flywheel is once again primarily determined by the long-stroke springs. Thus, the arrangement of the long-stroke springs working in dependence on the centrifugal force, in combination with short-stroke and comparatively rigid springs working independently of the centrifugal force, ensures that the resonant frequency of the flywheel is at very low frequencies at a low speed and at higher frequencies at a higher speed. Thus the vibrations occurring in the drive train always remain in the supercritical range of the flywheel.

As a result of this design, the compliance of the spring arrangement between the flywheel elements decreases with an increasing speed and correspondingly, excessive relative rotations between the flywheel elements are prevented if load alternations occur at higher speeds and with increased transmitted torques.

Since the flywheel elements always remain elastically coupled by means of the short-stroke relatively rigid springs, even at higher speeds, this ensures a good separation in terms of vibration between the drive train and the engine which, at higher speeds, excites vibrations of higher frequencies and of relatively low amplitude.

Also of advantage in this drive arrangement is the provision of a second spring system connected in series with the first spring system and which works by friction independent of centrifugal force. These two springs systems can be mounted radially of one another.

Having the long-stroke spring mounted between abutments on one flywheel element within a V-shaped member and between two abutment pieces on an annular disc located within said V-shaped member provides an advantageous mounting. Here the second flywheel element can be mounted on a shaft extension of the first flywheel and the second spring can be mounted between two additional annular discs also mounted to the other flywheel. It is advantageous to provide a additional frictional drive inwardly of these additional annular discs and located on the shaft extension of the first flywheel.

Both the second spring means and the additional frictional drive can be provided with a lost motion connection which requires some rotational movement prior to compression of the spring. The inner frictional drive has a smaller lost motion connection that the first lost motion connections.

Also advantageous in the sealing of the spring chambers is the filling them with a lubrient to obtain a pumping action between the annular discs and flywheel.

Other objects, advantages and novel features of the present invention will become apparent from the following detailed description of the invention when considered in conjunction with the accompanying drawings.

DETAILED DESCRIPTION OF THE INVENTION

Figure 1:
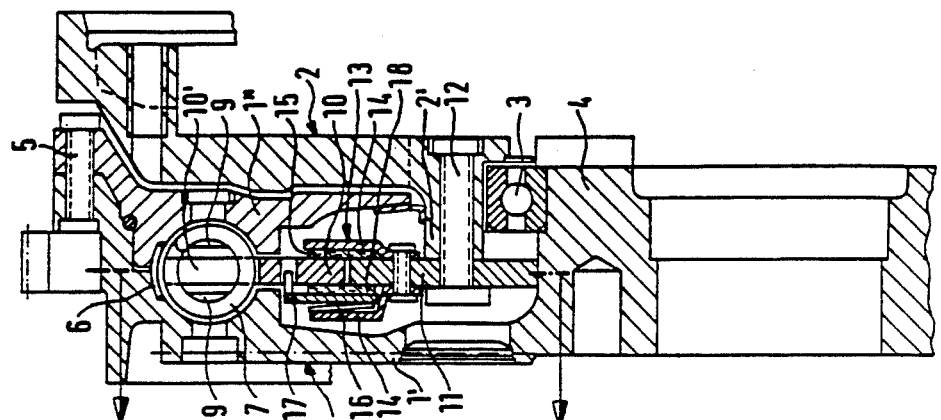
FIG. 1 shows an axial section through a first embodiment of the split flywheel with long-stroke helical springs working in dependence on centrifugal force being provided as a spring arrangement.

In the flywheel illustrated in FIG. 1, the flywheel element 1 is coupled to the engine and the flywheel element 2 is coupled to a drive train via a coupling (not shown).

The flywheel element 1 has a hub part 4 and a part 1' connected in one piece with the hub part 4 and a part 1" in the form of an annular disc, which is flanged to the part 1' by means of screws 5 arranged in a ring. An annular space, open towards the hub part 4, is located between the parts 1' and 1" of the flywheel element 1.

This annular space has a radially outer region of approximately circular cross-section. This region is closed on its radially outer face by means of shell parts 6 which cover the seam between the parts 1' and 1" of the flywheel element 1. Arranged within the outer region of approximately circular cross-section are long-stroke helical springs 7 having a curved helical axis, the center of curvature of which lies on the rotational axis of the flywheel. Cap-shaped stop pieces 8 (FIG. 2) are inserted in both end faces of the helical springs 7.

The helical springs 7 are multiple in number for example four-fold in succession in the circumferential direction around the periphery of the flywheel element 1. The helical springs 7 urge the stop pieces 8 against abutment pieces 9 which are arranged on both sides of a radial plane of the flywheel element 1, which contain mutually confronting end faces of the helical axes of the helical springs 7 on the parts 1' and 1" of the flywheel elements 1. The distance between the abutment pieces 9 in the axial direction of the flywheel is less than the diameter of the helical springs 7 and of the stop pieces 8. The end faces of the helical springs 7, or of the stop pieces 8, are accordingly overlapped by the abutment pieces 9.

Inside the annular space formed by the parts 1' and 1" of the flywheel element 1 is an annular disc 10 having extensions 10' Pointing radially outwards and arranged radially with the end areas of the helical springs 7.

The extensions 10' of the annular disc 10 have, in the circumferential direction of the flywheel, approximately the same distances from one another as the abutment pieces 9. The extensions 10' project respectively into the clearance space between mutually confronting end faces of two helical springs 7 in such a way that the extensions 10' overlap the end faces of the helical springs 7, or of the stop pieces 8. As shown schematically in FIG. 3, the helical springs 7 thus are held by abutment pieces 9 and extensions 10' on both ends.

When the annular disc 10 is rotated relative to the flywheel element 1, the helical springs 7 are compressed independently of the relative direction of rotation, between one of the extensions 10' at one end of each helical spring 7 and one of the two abutment pieces 9 at the other end of the particular helical spring 7.

The annular disc 10 is arranged concentrically within the flywheel element 1. An annular disc 11 is arranged in the same plane as annular disc 10 and is fastened by means of screw bolts 12 to an annular web 2' of flywheel element 2, which faces the flywheel element 1.

The annular disc 11, has extensions 11' arranged on its radially outer circumferential edge, which extensions 11' project into corresponding recesses on the inner circumferential edge of the annular disc 10. The extensions 11' have a play (2 S) in the circumferential direction within the said recesses of the annular disc 10 to allow the annular discs 10 and 11 to rotate a corresponding amount relative to one another. As soon as the play (2 S) is used up, the annular discs 10 and 11 then move jointly in one particular direction of rotation.

In addition to the positive coupling of the annular discs 10 and 11, there is also a frictional coupling between these discs. The friction-coupling arrangement 13 serves this purpose. Disc rings 14 are flanged to the annular disc 11 on its two side faces and overlap adjacent zones of the annular discs 10 and 11. The disc ring 14 on the right in FIG. 1, carries a first friction lamella 15 which rests on the confronting side faces of the annular discs 10 and 11. Supported on the disc ring 14, on the left in FIG. 1, is a spring ring 16 which is clamped against a disc ring 17 which is non-rotatable relative to the annular disc 10, but is axially displaceable and which carries a further friction lamella 18 on its side facing the annular discs 10 and 11. Accordingly, adjacent zones of the side faces of the annular discs 10 and 11 are clamped between the frictional lamellae 15 and 18 and thus the annular discs 10 and 11 are coupled frictionally to one another.

The space taken up by the helical springs 7 and by the friction-coupling arrangement 13 can, if appropriate, be filled with lubricant. To prevent losses of lubricant, a sealing ring 19 or a sealing lamella is then arranged between the radially inner edge of the part 1" of the flywheel element 1 and the annular web 2' of the flywheel element 2.

The split flywheel described above functions essentially as follows:

Flywheel elements 1 and 2 can execute rotational vibrations relative to one another and counter to the force of the helical springs 7. Insofar as low torques are not capable of overcoming the frictional connection of the friction-coupling arrangement 13 between the flywheel elements 1 and 2, the annular disc 10 always rotates together with the flywheel element 2. At higher torques, the friction-coupling arrangement 13 can slip. This provides a relative rotation between the flywheel element 2 and the annular disc 10, but this is limited by the play (2 S) available by the extensions 11' of the annular disc 11 in the radially inner recesses of the annular disc 10.

It should be noted that at higher speeds of the flywheel, the helical springs 7 are urged radially outwards up against the shell parts 6. Movements of the helical springs 7 thereby cause appreciable friction which acts as additional resistance when the flywheel elements 1 and 2 seek to rotate relative to one another. Accordingly, the coupling between the flywheel elements 1 and 2 which is obtained by means of the helical springs 7 is stiffened at higher speeds.

Insofar as the annular space which is enclosed by the parts 1' and 1" of the flywheel element 1 is filled with lubricant, or a hydraulic medium, there is still a certain hydraulic resistance which becomes effective during relative rotations of the flywheel elements 1 and 2. In particular, as soon as the helical springs 7 are compressed as a result of the relative rotations, the stop pieces 8 of each helical spring 7 act in a piston-like manner and approach one another to displace hydraulic medium from the space between the mutually approaching stop pieces 8. This occurs counter to a flow and throttling resistance, the amount of which depends on, among other things, how narrow are the annular gaps between the annular disc 10 and the parts 1' and 1" of the flywheel element 1 radially with the helical springs 7.

Figure 2:
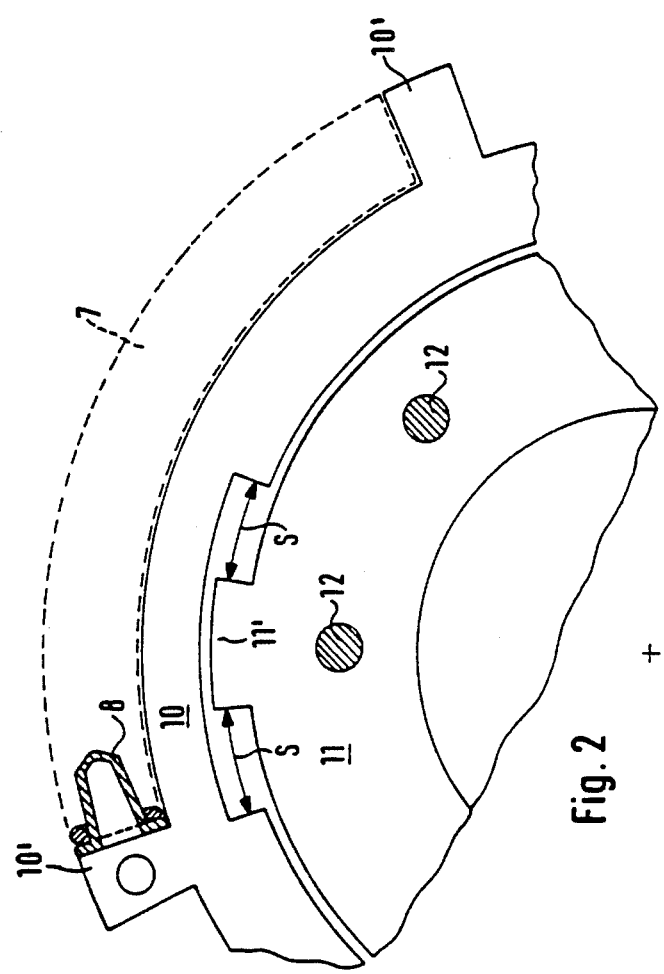
FIG. 2 shows a radial section corresponding to the sectional plane II—II of FIG. 1.
Figure 3:
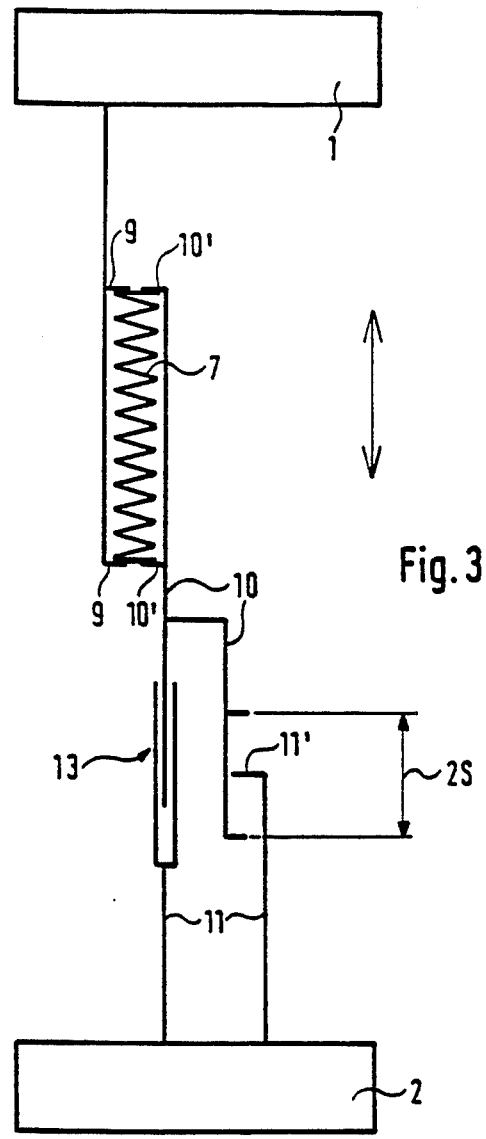
FIG. 3 shows a functional diagram of the flywheel illustrated in FIGS. 1 and 2.

FIG. 3 shows diagrammatically the flywheel illustrated in FIGS. 1 and 2. The two flywheel elements 1 and 2 being represented diagrammatically as heavy bodies which can move away from one another and approach one another counter to the force of the spring 7. The relative rotations actually occurring between the flywheel elements 1 and 2 are therefore reproduced as purely translational movement in the representation of FIG. 3. Moreover, elements corresponding to one another in FIG. 3 and FIGS. 1 and 2 bear the same reference symbols. When the spring 7 is sufficiently tensioned, the frictional connection of the frictional-coupling arrangement 13 is overcome. That is, the elements 10 and 11 in FIG. 3 shift relative to one another, until the play (2 S), between an extension 11' on the element 11 and stops on the element 10 which interact with it, is used up. It can be seen during relative movements of the flywheel elements 1 and 2, that the spring 7 is compressed respectively between an extension 10' and abutment pieces 9.

Figure 4:
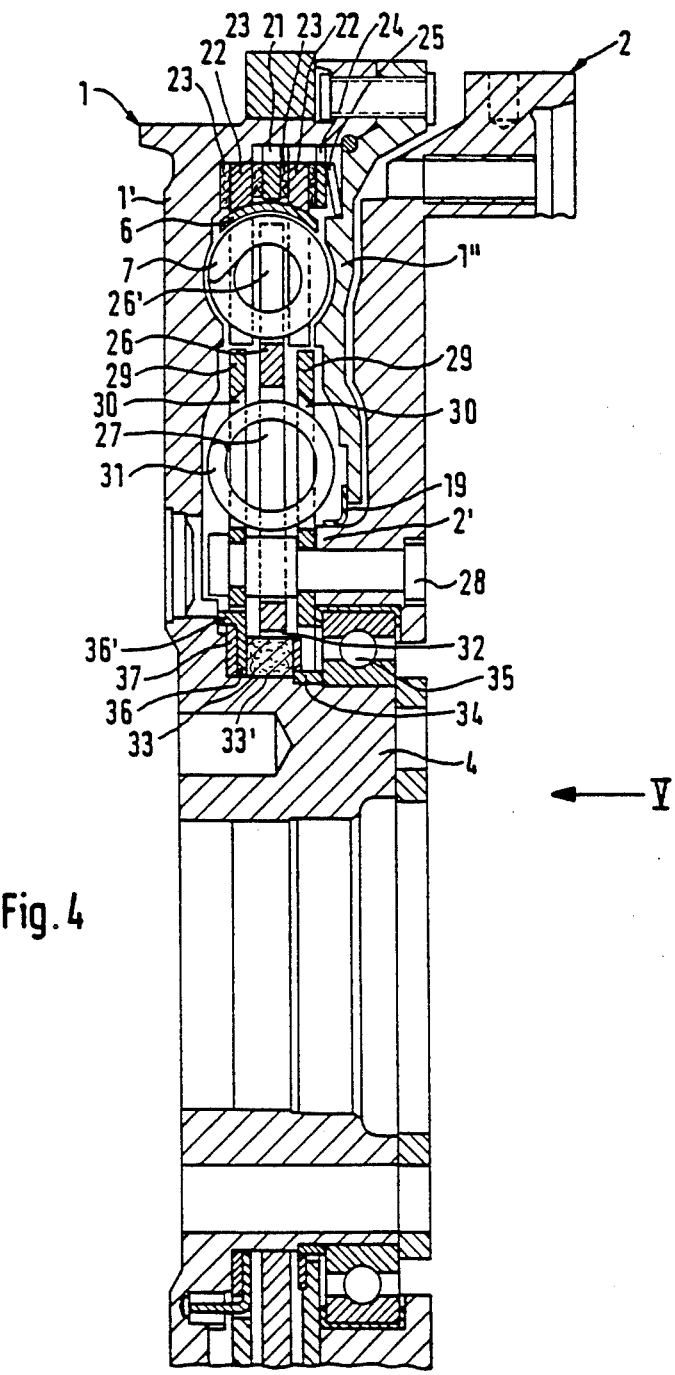
FIG. 4 shows an axial section through a further embodiment of the flywheel in which there is a second spring group which consists of short-stroke relatively rigid springs working substantially independently of centrifugal force, connected in series with a first spring group, consisting of long-stroke springs working in dependence on centrifugal force.
Figure 5:
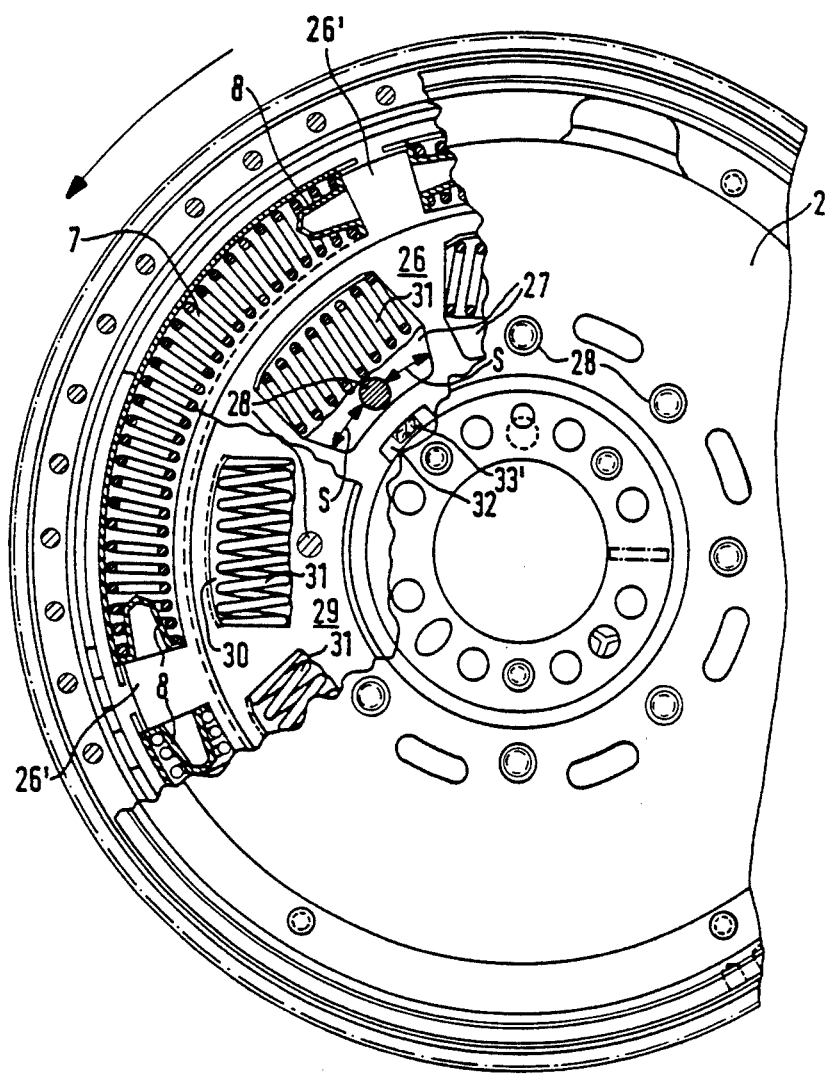
FIG. 5 shows a partially cutaway from view of the flywheel shown in FIG. 4, according to the arrow V.
Figure 6:
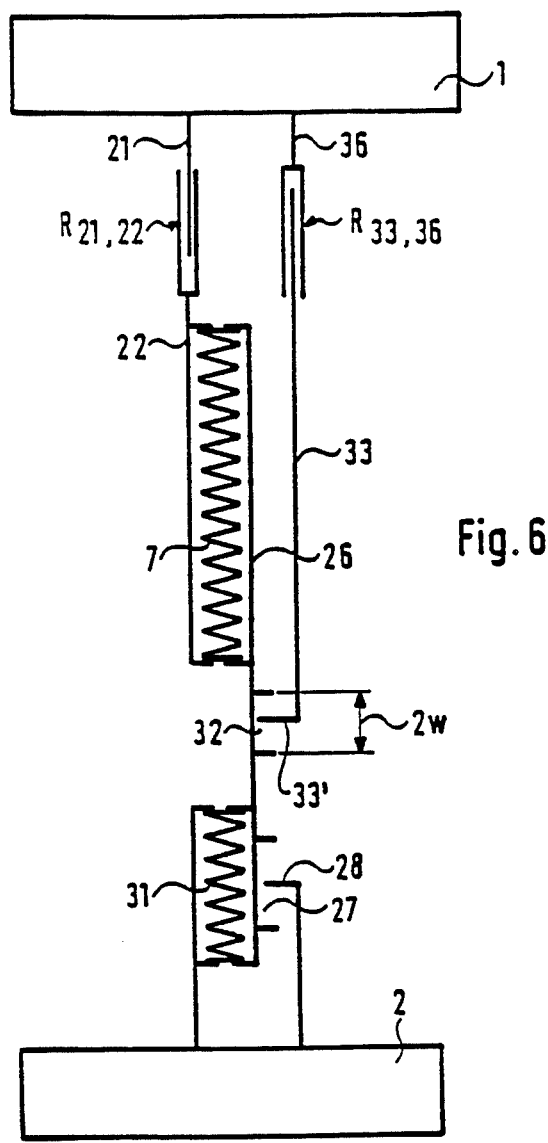
FIG. 6 shows a functional diagram of the flywheel illustrated in FIGS. 4 and 5.

In the embodiment illustrated in FIGS. 4 to 6, an annular part 21 is retained non-rotatably, but axially displaceable within the radially inwardly opened annular chamber limited by the parts 1' and 1" of the flywheel element 1, on the circumferential wall of the said annular chamber. This annular part 21 has only relatively small dimensions in the radial direction. Annular discs 22 are arranged adjacent to the side faces of the annular part 21 so as to be axially displaceable and rotatable relative to the flywheel element 1. Friction lamellae 23 are inserted between the annular discs 22 and the annular part 21, and further frictional lamellae 23 are arranged between the annular disc 22 on the left in FIG. 4 and the part 1' of the flywheel element 1 and between the annular disc 22 on the right in FIG. 4 and a further annular part 24 which is retained axially displaceably, but non-rotatably on the part 1' of the flywheel element 1 and which is urged to the left in FIG. 4 by an annular spring 25 supported on the part 1" of the flywheel element 1. The annular discs 22, the annular part 21 and the frictional lamellae 23 are accordingly pressed onto one another, so that the annular discs 22 are held frictionally in the circumferential direction of the flywheel to rotate relative to the flywheel element 1 at higher torques.

The annular discs 22 possess aperture in the form of an arc of a circle radially within the annular part 21. The apertures extend in the circumferential direction and house the long-stroke helical springs 7 in a cage-like manner. The springs 7 are curved in the form of an arc of a circle and with a center of curvature at the axis of the flywheel. The helical springs 7 attempt to come with their end faces or the stop pieces 8 arranged against radial webs (similar to pieces 9 of the FIG. 1 embodiment) of the annular discs 22 remaining between the said apertures.

Shell parts 6 are retained in the apertures on the radially outward-point side of the helical springs 7 to support the helical springs 7 radially outwards against centrifugal forces.

Arranged axially between the annular discs 22 and radially within the helical springs 7 is an annular disc part 26. The disc part has radially outward-pointing extensions 26' which project into the clearance spaces between helical springs 7 in the circumferential direction and which overlaP the end faces of the helical springs 7 or their stop pieces 8. When the disc part 26 is rotated relative to the annular discs 22, the helical springs 7 are therefore compressed respectively between an extension 26' of the disc part 26 and circumferentially opposite radial edges of the apertures or recesses arranged in the annular discs 22 for the helical springs 7.

The disc part 26 is rotatable to a limited extent relative to the flywheel element 2. The rotatability is limited by springs 31 located in apertures 27 which are arranged in the disc part 26 and through which pass bolts 28, arranged in a ring-like manner on the flywheel element 2 in the region of the annular web 2'.

The bolts 28 serve for retaining two annular discs 29 which are arranged at a short axial distance from the disc part 26 on two side faces of the disc part and which are connected firmly to the flywheel element 2. Apertures 30 extend in the annular discs 29 radially outside the annular web 2' of the flywheel element 2. The apertures 30 extend in the circumferential direction and receive helical springs 31 in a cage-like manner. Springs 31, are short and rigid in comparison with the helical springs 7. The helical springs 31 have an essentially rectilinear helical axis.

The apertures 27 in the disc part 26 extend sufficiently far radially outwards to make it possible to retain the springs 31 in the apertures 30 of the annular discs 29. In the region of the springs 31, the apertures 30 and 27 have approximately equal dimensions in the circumferential direction, so that the springs 31 seek to urge the annular discs 29 and the disc part 26 into a mid-position relative to one another. Radial edges of the apertures 27 and 30 are aligned with one another, as seen in an axial view of the flywheel. When the disc part 26 is rotated relative to the annular discs 29, the springs 31 are compressed respectively between a radial edge of the apertures 27 and circumferentially opposite edges of the apertures 30. The disc part 26 has recesses 32 on its inner circumference enclosing the hub part 4 of the flywheel element 1. The recesses 32 receive axial extensions 33' of a friction ring 33 with a play (2 w) in the circumferential direction. The play (2 w) as a whole is here less than the play (2 S) of the bolts 28 in the aperture 27. The extensions 33' rest by means of their ends (on the right in FIG. 4) against a supporting ring 34 of angular profile. One leg of ring 34 surrounds the hub part and rests against the bearing shell of a grooved ballbearing 35, by means of which the flywheel element 2 is rotationally mounted on the hub part 4 of the flywheel element 1. The friction ring 33, by means of its side face turned away from the extensions 33', interacts with a counter friction ring 36 which is arranged axially displaceably on the hub part 4 and which is held non-rotatably relative to the flywheel element 1 by means of angled extensions 36'. Extensions 36' engage into corresponding recesses in the flywheel element 1. Clamped axially between the counter friction ring 36 and the flywheel element 1, or its part 1', is annular cup spring 37 which urges the counter friction ring 36 against the friction ring 33, and the latter, by means of its extensions 33', against the supporting ring 34 which then in turn clamps the bearing shell of the grooved ball bearing 35 on the hub part 4 against an annular flange arranged on the hub part 4. The cup spring 37 thus has a double function. First it presses the friction ring 33 and the counter friction ring 36 against one another and, second it secures the position of the inner bearing shell of the grooved ball bearing 35. To increase the friction between the friction ring 33 and the counter friction ring 36, friction lamellae (not shown) can be arranged between these two parts.

Thus, as soon as the annular disc 29 is rotated relative to the flywheel element 2 far enough that the movement play (2 w) of the extensions 33' in the recesses 22 is used up, the disc part 26 during its further movement takes up the friction ring 33. That is, the frictional resistance of the slipping coupling formed by the rings 33 and 36 counteracts the further movement of the disc part 26 relative to the flywheel element 2.

The functioning of the flywheel illustrated in FIGS. 4 and 5 can be seen best in FIG. 6, in which the flywheel elements 1 and 2 are once again, as in FIG. 3, shown diagrammatically as heavy bodies which can approach one another or move away from one another. That is the relative rotations between the flywheel elements 1 and 2 are reproduced in FIG. 6 as purely translational movements. Moreover, elements corresponding to one another in FIGS. 4 to 6 bear the same reference symbols.

As long as relatively low torques are effective between the flywheel elements 1 and 2, during relative movements between the flywheel elements 1 and 2, the annular discs 22 move together with the flywheel element 1 or the annular part 21. That is the friction connection $R_{21,22}$ between the annular part 21 and annular discs 22 works without any slip. According to the extent of the relative movements between the flywheel elements 1 and 2, the springs 7 and 31 are compressed to a greater or lesser degree. The play (2 w) available to the extension 33' of the friction ring 33 within the recesses 32 in the disc part 26 can possibly be used up thereby. Depending on the torques effective between the flywheel elements 1 and 2, as a result of the frictional connection $R_{33,36}$ between the friction ring 33 and the counter friction ring 36, a further relative movement between the flywheel element 1 and the disc part 26 in one direction of movement is prevented so that the springs 7 initially cannot be compressed any further. As torques increase, the frictional connection $R_{33,36}$ is then overcome so that friction ring 33 slips relative to the counter friction ring 36 and the springs 7 are compressed somewhat further. When the relative direction of movement of the flywheel elements 1 and 2 is reversed, the disc part 26 can the first move over a distance (2 w) before the frictional connection $R_{33,36}$ becomes effective again.

At very high torques between the flywheel elements 1 and 2, the frictional connection $R_{21,22}$ between the annular discs 22 and the annular part 21 can also work with a slip, thus limiting the maximum torque transmissible between the flywheel elements 1 and 2.

The mobility of the disc part 26 relative to the flywheel element 2 is limited as a result of the interaction of the bolts 28 with the apertures 27 of the disc part 26. This prevents the possibility that the springs 31 will be fully compressed to a block.

A Particular feature of the flywheel is that the springs 7 work by friction dependent on centrifugal force. At high speeds, the springs 7 can be considered approximately as rigid components, so that only the springs 31 are effective as resilient elements between the flywheel elements 1 and 2.

In contrast to the embodiment described above, it is also possible for the annular discs 22 to be movable relative to the flywheel element 1 to only a limited extent. This can be obtained, for example, if there are arranged on the annular discs 22, radially outwardly projecting extension or projections which interact with counter projections or recesses on the flywheel element 1 and which limit the maximum rotation of the annular discs 22 relative to the flywheel element 1.

Furthermore, the disc part 26 can be subdivided radially between the long-stroke springs 22 and the short-stroke springs 31, such that portions of the disc part 26 can be rotated to a limited extent relative to one another and counter to a resistance. For this purpose, the portions of the disc part 26 can be coupled to one another frictionally or with play and positively in a manner to the coupling of annular discs 10 and 11 in FIGS. 1 and 2.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A split flywheel for driving insertion between an engine and a driving unit, having two equiaxial flywheel elements with essentially apportioned flywheel masses has a spring arrangement means drivingly inserted between the flywheel elements for absorbing vibrations and transmitting power therebetween;
   a non-positive coupling means positively connected between an abutment part of the spring arrangement means and one flywheel element for limiting the power transmitted by the spring arrangement means during excessive vibrations and high torque transfers;
   said spring arrangement means comprising at least a longstroke non-prestressed or negligibly prestressed helical spring means which has a helical axis in the form of an arc of a circle, with a center of curvature at the flywheel axis;
   the helical spring means, in response to centrifugal force, being operated by an additional friction force against bearing faces arranged on at least one of the abutment part and a flywheel element which supports the helical spring means in a centrifugal radially outwards movement relative to the flywheel axis to stiffen the helical spring means during normal and high engine speeds where the engine normally drives the driven unit to reduce vibration absorption and relative motion between the flywheel elements;
   and wherein spring constants of the spring arrangement means are so soft that the vibrations occurring at a low engine speed when the engine is not used to drive the driven unit are in the supercritical range and the helical spring means operates without the additional friction force allowing greater relative motion between the flywheel elements.

2. A split flywheel according to claim 1, wherein there is a further spring group means connected in series with said long-stroke helical spring means and which are composed of relatively short-stroke spring means which work by friction substantially independent of centrifugal force to provide vibration absorption when the helical spring means have their vibrational absorption reduced.

3. A split flywheel according to claim 2, wherein the two spring means are arranged radially above one another.

4. A split flywheel according to claim 1 wherein the long-stroke spring means are received on one flywheel element within a U-shaped member between abutment pieces which are spaced from one another in the circumferential direction and which overlap end faces of the long stroke spring means on both sides of a radial plane of the flywheel continuing the helical axes;
   an annular disc means arranged axially as an abutment part between the abutment pieces and coupled to the other flywheel element for transmitting the drive from the spring arrangement to the other flywheel element;
   said annular disc means having recesses in the region of the long-stroke spring means;
   and wherein radial regions of the annular disc means overlap the end faces of the long-strike spring means in the peripheral direction between the long-stroke spring means.

5. A split flywheel according to claim 4 wherein the annular disc means is positively coupled, with play in the circumferential direction, to a further annular disc means fastened to the other flywheel element to provide said drive from the spring arrangement to the other flywheel element.

6. A split flywheel according to claim 5, wherein the two annular disc means engage into one another with play in the circumferential direction through radial projections and recesses;
   and wherein there are friction lamellae which overlap the two disc means and are retained on the two disc means and which are pressed against side faces of the two disc means.

7. A split flYwheel according to claim 1, wherein the long-stroke spring means have abutment friction elements coupled to one flywheel element.

8. A split flywheel according to claim 7, wherein the abutment friction elements are movable to a limited extent in relation to one flywheel element.

9. A split flywheel according to claim 7 wherein the abutment friction elements are formed as annular discs arranged on both sides of the long-stroke helical-spring means axes and have radial regions overlapping the end faces of the long-stroke spring means; and
   wherein shell parts means are retained on the annular discs and have a cross-section in the form of an arc of a circle to provide radially outwards support for the long-stroke spring means.

10. A split flywheel according to claim 9, wherein an intermediate carrier disc is arranged axially in one plane between the annular discs and overlaps the end faces of the long-stroke spring means by means of radial parts and which is coupled to the other flywheel element via another spring means.

11. A split flywheel according to claim 10, wherein the intermediate carrier disc is arranged axially between two discs arranged on the other flywheel element and has several apertures which are tangential relative to the flywheel axis; in which the other spring means are received in a cage-like manner; and
   wherein radial extensions are arranged on the intermediate carrier disc between the other spring means.

12. A split flywheel according to claim 10 wherein the intermediate carrier disc is rotatable to a limited extent in relation to the other flywheel element; and wherein there are bolts means for retaining the two discs and the intermediate carrier disc.

13. A split flywheel according to claim 10 wherein the intermediate carrier disc is connected to a friction means engaged in a recess of the intermediate carrier disc by extensions extending in axial direction of the flywheel; and wherein the friction means are clamped axially against a counter friction ring which is retained on one flywheel element.

14. A split flywheel according to claim 13, wherein at least one of the extensions and counter friction ring are arranged in the recess with play in the circumferential direction.

15. A split flywheel according to claim 14, wherein one flywheel element has a central axial extension and the other flywheel element is rotationally mounted on the axial extension by a bearing;

an inner bearing shell of the bearing being clamped against an annular wall arranged on the axial extension;

the friction means being arranged axially between two counter pressure friction rings which are radially displaceable on the axial extensions and wherein one of the two counter pressure friction rings is supported on the inner bearing shell and the other is tensioned in the direction of the inner bearing shell by means of an additional spring arrangement.

16. A split flywheel according to claim 14, wherein one flywheel element has a central axial extension and the other flywheel element is rotationally mounted on the axial extension by a bearing; a inner bearing shell of the bearing being clamped against an annular wall arranged on the axial extension;

the friction means being arranged axially between two counter pressure friction rings;

the inner bearing shell and one pressure friction ring adjacent to the bearing shell are arranged as abutments of an additional cup-spring means which urges the last-mentioned pressure friction ring away from the bearing shell against an abutment interacting with the other friction pressure ring.

17. A split flywheel according to claim 1 wherein the long-stroke helical spring means is arranged within an annular chamber filled with lubricant.

* * * * *